United States Patent [19]

Signer

[11] Patent Number: 5,688,047
[45] Date of Patent: Nov. 18, 1997

[54] STATIC MIXER WITH MONOLITHIC MIXING ELEMENTS PROVIDING AN INCREASED RESISTANCE FORCE DURING MIXING

[75] Inventor: Arno Signer, Wiesendangen, Switzerland

[73] Assignee: Sulzer Chemtech AG, Winterthur, Switzerland

[21] Appl. No.: 694,005

[22] Filed: Aug. 7, 1996

[30] Foreign Application Priority Data

Aug. 30, 1995 [EP] European Pat. Off. ........... 95810538.9

[51] Int. Cl.$^6$ .................................................. B01F 5/06
[52] U.S. Cl. .................................................. 366/337
[58] Field of Search ........................ 366/181.5, 336, 366/337, 340; 138/38, 40, 42

[56] References Cited

U.S. PATENT DOCUMENTS

| | | | |
|---|---|---|---|
| 4,062,524 | 12/1977 | Brauner et al. | 366/340 |
| 4,072,296 | 2/1978 | Doom | 366/337 |
| 4,170,446 | 10/1979 | Schutz et al. | 366/337 X |
| 4,220,416 | 9/1980 | Brauner et al. | 366/340 X |
| 4,352,378 | 10/1982 | Bergmann et al. | 366/337 X |
| 4,511,258 | 4/1985 | Federighi et al. | 366/337 |
| 4,643,584 | 2/1987 | Allocca . | |
| 4,765,204 | 8/1988 | Buchholz et al. | 366/337 X |
| 5,484,203 | 1/1996 | King et al. | 366/337 |
| 5,520,460 | 5/1996 | Lantz | 366/337 |

FOREIGN PATENT DOCUMENTS

| | | | |
|---|---|---|---|
| 0 226 879 | 7/1987 | European Pat. Off. . | |
| 2509784 | 11/1975 | Germany | 366/337 |
| 28 08 854 | 1/1979 | Germany . | |
| 642 564 | 4/1984 | Switzerland . | |
| 2 020 987 | 11/1979 | United Kingdom . | |

*Primary Examiner*—Charles E. Cooley
*Attorney, Agent, or Firm*—Townsend and Townsend and Crew LLP

[57] ABSTRACT

The static mixer for viscous media comprises a tube and at least one mixing element arranged in the tube. The tube defines a main flow direction of the fluid to be mixed. The mixing element is formed as a monolithic structure with bars crossing one another and the bars each have an essentially rectangular cross section with a large and a small side. Crossing points of the bars are reinforced by local thickened portions. As a result of these thickened portions a common boundary surface between the bars which lies parallel to the main flow direction is at least about twice as large as the square area formed by the small side.

10 Claims, 3 Drawing Sheets

Fig. 2 PRIOR ART
Fig. 1 PRIOR ART
Fig. 3 PRIOR ART
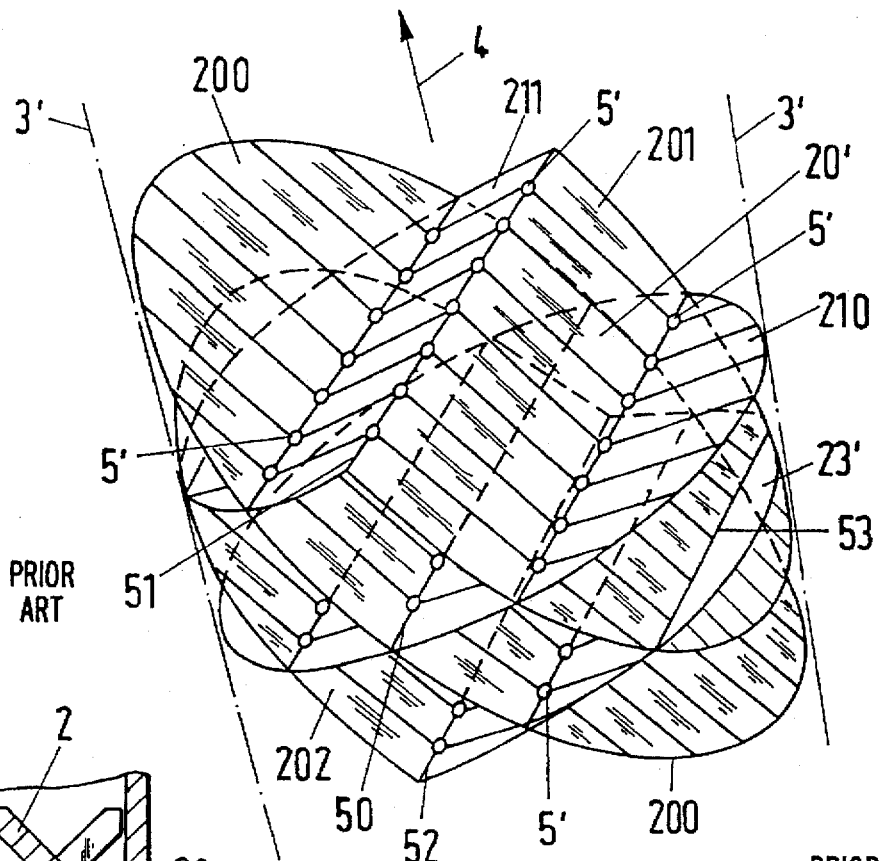
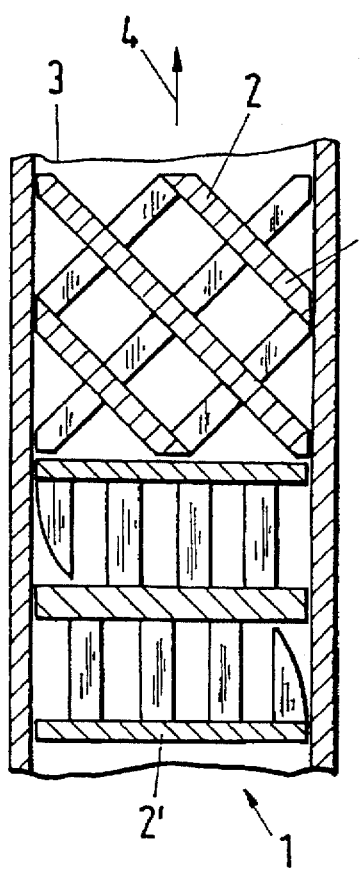
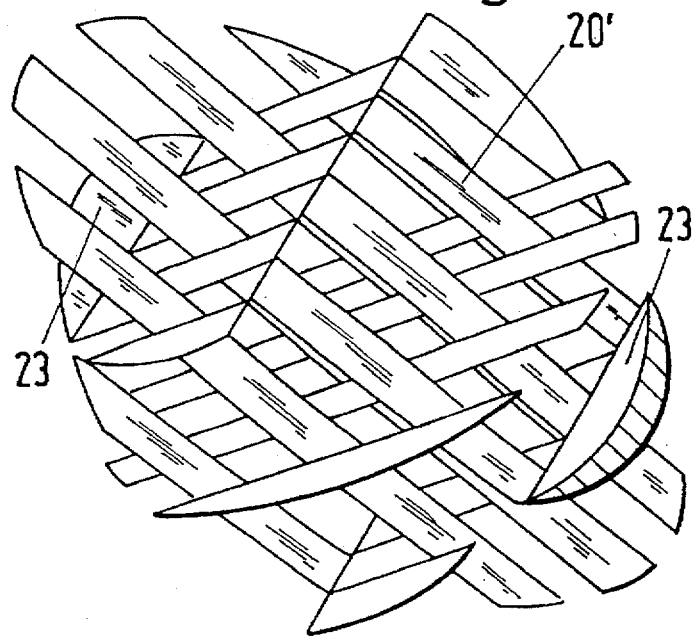

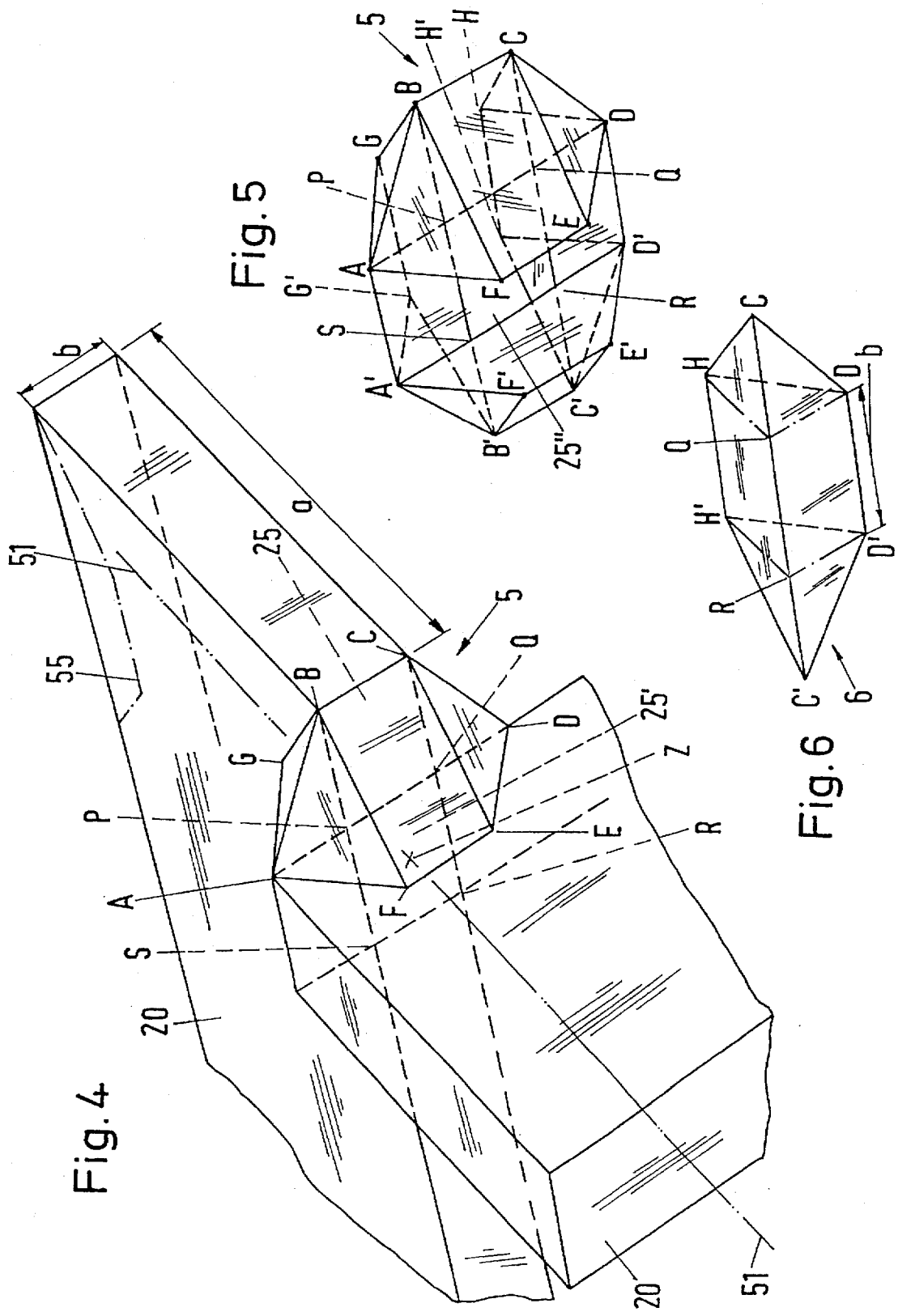

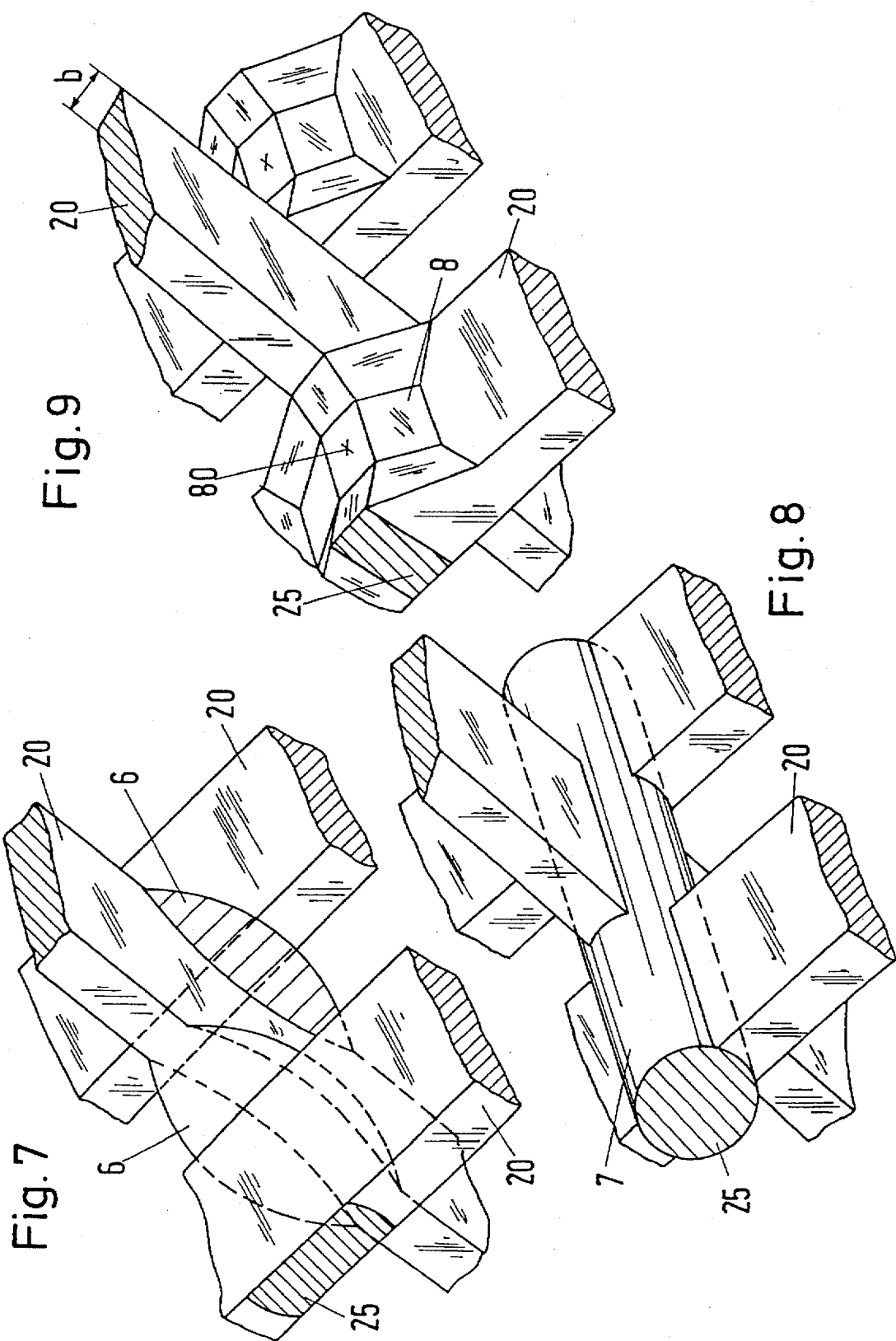

STATIC MIXER WITH MONOLITHIC MIXING ELEMENTS PROVIDING AN INCREASED RESISTANCE FORCE DURING MIXING

BACKGROUND OF THE INVENTION

1. Technical Field

The invention relates to a static mixer for viscous fluids, and in particular for plastic melts.

2. Description of the Prior Art

A static mixer is known from the patent specifications CH 642 564(=P.5473) or DE 28 08 854(=P.5285). Such a mixer's mixing element has a structure that consist of bars interengaging and crossing one another. The bars form two groups of structure elements arranged in parallel.

When mixing and homogenizing plastic melts, large pressure gradients generally occur in the main flow direction. Forces are associated with these pressure gradients which act on the bars and which can lead to the destruction of the mixing elements. Various mixer structures are used. The bars of which have an essentially square cross section. With these cross sections the pressure gradients are admittedly even greater—for the same throughput—than for less massive mixing elements with rectangular cross sections. However, due to the enlargement of the bar cross sections, the resistance force increases more rapidly than the stress connected with the increased pressure gradients so that the mixer is able to withstand the stress. An improvement of the resistance force can thus be achieved by the requirement of a higher energy input as well as a greater expenditure of material for the mixing elements.

Insufficient resistance force is observed in particular for monolithic mixing elements which are manufactured for example by precision casting.

SUMMARY OF THE INVENTION

The object of the invention is to provide a static mixer with monolithic mixing elements which is distinguished by an increased resistance force without the strengthening measures taken leading to a significant increase of the pressure gradients in the medium to be mixed. This object is satisfied by a static mixer having a tube and at least one mixing element arranged in the tube. The tube defines a main flow direction of the fluid to be mixed and the mixing element is formed as a monolithic structure with bars crossing one another and the bars have an essentially rectangular cross section with a large and a small side. The crossing points of the bars are reinforced by local thickened portions thereby defining a common boundary surface between the bars which lies parallel to the main flow direction, the common boundary surface being at least approximately twice as large as the square area formed by the small side. Thanks to the structure provided with the invention, an increased resistance force results with respect to torsion forces which act at the crossing points of the bars due to the pressure gradients and which can lead to breakage of standard mixers at these points. Thanks to this structure, the amount of material required is also reduced. The invention can be applied also to static mixers whose bars have a square cross section.

BRIEF DESCRIPTION OF THE DRAWINGS

FIG. 1 is a longitudinal section through a known static mixer;

FIG. 2 is an auxiliary figure for explaining the geometrical structure of a mixing element;

FIG. 3 illustrates the geometrical structure of a mixing element;

FIG. 4 perspective view illustrating two bars crossing one another at their tips with a thickened portion in accordance with the invention at the crossing point;

FIG. 5 is a perspective view illustrating the thickened portion of FIG. 4 without the bars;

FIG. 6 is a fragmentary view of a segment of the thickened portion of FIG. 4;

FIG. 7 is a perspective view of three bars crossing one another with segment-formed thickened portions;

FIG. 8 is a perspective view of three bars crossing one another in accordance with a third embodiment of the thickened portions; and FIG. 9 is a perspective of three bars crossing one another with a fourth embodiment of the thickened portions.

DETAILED DESCRIPTION OF THE PREFERRED EXEMPLARY EMBODIMENTS

In FIG. 1, a known static mixer 1 for viscous media is shown. It consists of a tube 3 and two mixing elements 2 and 2' arranged in the tube. The main flow direction 4 of the fluid to be mixed is defined by the tube 3 and is in the direction of the tube axis. The one mixing element 2 is rotated 90° about the tube axis 4 with respect to the other mixing element 2'. The mixing elements 2, 2' are formed as monolithic structures—namely as cast parts—with bars 20 crossing one another. The bars 20 have rectangular cross sections.

The spatial construction of a mixing element can be illustrated with reference to FIGS. 2 and 3: The strips 20' in FIG. 2 correspond to the bars 20 of FIG. 1 and their intermediate spaces. Some of these strips 20' span two elliptical surfaces 200 and 210 intersecting at a line 50. Further strips 20' form two elliptical subsurfaces 201 and 202 which are parallel to the surface 200. The remaining strips 20' form two elliptical subsurfaces 211 and 212 which are parallel to the surface 210. The crossing points of the strips 20' are marked by nodes 5'. One bar 20 of the mixing element corresponds to every other strip 20'(see FIG. 3).

Reinforcing thickened portions 5 in the mixing element 2 in accordance with the invention correspond to the nodes 5' in FIG. 2. In FIGS. 4 and 5, a thickened portion 5 of this kind is shown for a first exemplary embodiment. FIG. 4 shows two bars 20 which cross each other at their tips. The point Z lies at the center of a crossing point, which is associated in FIG. 2 with a node 5' on the line 51 (or on the line 52 where the same conditions prevail). The bars 20 have a rectangular cross section defined by sides a and b. The common boundary surface 25' of the bars 20 without thickened portions spanned by the corner points P, Q, R and S lies at the crossing point at Z.

Only the corner points A, B, C, D, E, F and G of the thickened portion 5 encompassing the crossing point Z as a ring are visible in FIG. 4. The entire thickened portion—with the omission of the bars 20—can be seen in FIG. 5. In addition to the previously mentioned corner points, the corner points A', B', C', D', E' and G' also appear in a mirror imaged array. In point of the common boundary surface 25' between the bars 20, a breakthrough 25" is present here. Due to the thickened portion 5 there is an enlarged common boundary surface between the bars, namely the surface 25 with the corners A, B, C, D, D', C', B' and A'. The thickened portion 5 is composed—seen geometrically—of four segments 6. A segment 6 is itself composed—see FIG. 6—of a prism with the corners D, D', R, H', H and Q and two tetrahedra with the additional corners C or C' respectively.

The chain of lines 55 illustrated in a broken line manner in FIG. 4 indicates the boundary of the thickened portion by means of which the crossing point lying further behind and adjacent to the point Z is reinforced.

The node points 5'(FIG. 2) in the interior of the mixing element—on the intersection line 50, for example—can also be reinforced with the zing-formed thickened portions 5 shown in FIG. 5. For the node line 53 lying on the boundary, no reinforcements and hence no thickened portions 5 are required.

A segment-formed body 23' is provided in this boundary region. A corresponding body portion 23 of the monolithic mixing element 2 (cf. FIG. 3) fills out a zone in the mixer 1 in which, in the known mixers, the fluid to be mixed has a considerably longer transit time than in the interior of the mixer. Such a body 23 is thus advantageous in cases for which a narrow transit time spectrum is desired.

In each of the three further exemplary embodiments of FIGS. 7 to 9 there are shown three bars 20 crossing one another at two crossing points. In FIG. 7 the thickened portion of a crossing point consists of two separate segments 6, of which one lateral surface has a rounded form. At the lateral surface of the front bar 20 the enlarged common boundary surface between adjacent bars is indicated.

In FIGS. 8 and 9, the thickened portions of adjacent crossing points are connected to one another. In the embodiment of FIG. 8 these thickened portions are all boundary regions of a cylindrical rod 7. The cross section 25 shown of this rod 7 corresponds to the enlarged common boundary surface between adjacent bars 20. The rod 7 can also be formed as a prism so that the cross section 25 has the form of a polygon.

The fourth exemplary embodiment in FIG. 9 shows a thickened portion 8 which is placed on one side of the bar only. Naturally a second, corresponding thickened portion can likewise be provided on the other side as well. The thickened portion 8 can also have a rounded form, so that, for example, position 80 is a saddle point. In this embodiment the common surface area 25 is approximately twice as large as the common boundary area of the bars 20 without thickened portion.

The theory of the present invention can of course be transferred to mixers with bars crossing one another which do not have the special construction illustrated in FIGS. 1 to 3. For example, the number of parallel surfaces 200, 201 and 202 can be larger and/or the number of bars 20 per surface can be smaller.

As a rule the monolithic mixing elements are precision cast parts. However, they can also be manufactured by means of a metal powder injection molding process. In this process a green part is made from a mixture of metal powder and organic substances by means of injection molding. Subsequently the organic substances are removed thermally to a great extent and the green part, in which the metallic components continue to adhere to one another, is tightly sintered to its final form.

What is claimed is:

1. A static mixer for viscous media which comprises a tube and at least one mixing element arranged in the tube, the tube defining a main flow direction of the fluid to be mixed and the mixing element being formed as a monolithic structure with bars crossing and interengaging one another, at various crossing points the bars each having an essentially rectangular cross section with a large and a small side, wherein the crossing points of the bars are reinforced by local thickened portions thereby defining a common boundary surface between the bars which lies parallel to the main flow direction, the common boundary surface being at least approximately twice as large as the square area formed by the small side.

2. A static mixer in accordance with claim 1 wherein the thickened portions are formed by additional material which fills out at least one corner region between the bars at each of the crossing points.

3. A static mixer in accordance with claim 1 wherein most of said crossing points have thickened portions, excluding those crossing points which are placed in a boundary region in the vicinity of the tube.

4. A static mixer in accordance with claim 1 wherein the thickened portions are each formed as rings encompassing the crossing points.

5. A static mixer in accordance with claim 1 wherein the thickened portions associated with adjacent crossing points and that lie on straight lines perpendicular to the main flow direction are connected to one another.

6. A static mixer in accordance with claim 5 wherein the thickened portions that are connected to one another each form boundary areas of a cylindrical or prismatic rod.

7. A static mixer in accordance with claim 1 wherein at least some of the thickened portions each encompass one segment or two separate segments.

8. A mixing element for use with a static mixer for viscous media, the mixing element being formed as a monolithic structure with bars crossing and interengaging one another at various crossing points, the bars each having an essentially rectangular cross-section with a large and a small side, wherein the crossing points of the bars are reinforced by local thickened portions thereby defining a common boundary surface between the bars that lies parallel to a main flow direction of fluid being mixed in the static mixer, the common boundary surface being at least approximately twice as large as the square area formed by the small side.

9. A mixing element in accordance with claim 8 wherein the mixing element is a precision casting.

10. A mixing element in accordance with claim 8 wherein the mixing element is a monolithic part that is manufactured by means of metal powder injection molding.

* * * * *